(12) United States Patent
Szilagyi et al.

(10) Patent No.: US 11,695,847 B2
(45) Date of Patent: *Jul. 4, 2023

(54) THROUGHPUT GUIDANCE BASED ON USER PLANE INSIGHT

(71) Applicant: NOKIA SOLUTIONS AND NETWORKS OY, Espoo (FI)

(72) Inventors: Peter Szilagyi, Budapest (HU); Csaba Vulkan, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 500 days.

This patent is subject to a terminal disclaimer.

(21) Appl. No.: 16/222,171

(22) Filed: Dec. 17, 2018

(65) Prior Publication Data

US 2020/0195742 A1 Jun. 18, 2020
US 2021/0099537 A9 Apr. 1, 2021

Related U.S. Application Data

(63) Continuation of application No. 15/503,598, filed as application No. PCT/EP2015/068518 on Aug. 12, 2015, now Pat. No. 10,367,738.
(Continued)

(51) Int. Cl.
*H04L 67/562* (2022.01)
*H04L 43/0882* (2022.01)
*H04L 69/16* (2022.01)

(52) U.S. Cl.
CPC ........ *H04L 67/562* (2022.05); *H04L 43/0882* (2013.01); *H04L 69/16* (2013.01)

(58) Field of Classification Search
CPC . H04L 67/2809; H04L 69/16; H04L 43/0882; H04L 67/562
See application file for complete search history.

(56) References Cited

U.S. PATENT DOCUMENTS 6,728,270 B1 * 4/2004 Meggers ............... H04L 47/822
370/252
6,735,634 B1 * 5/2004 Geagan, III ............ H04L 65/80
375/E7.025
(Continued)

FOREIGN PATENT DOCUMENTS

CN 101516110 A 8/2009
CN 101635678 A 1/2010
(Continued)

OTHER PUBLICATIONS

A. Jain, A.Terzis, H.Flinck, N.Sprecher, S.Arunachalam, K.Smith, V.Devarapalli, R.Bar Yanai, Mobile Throughput Guidance Inband Signaling Protocol, https://tools.ietf.org/html/draft-flinck-mobile-throughput-guidance-04, Mar. 13, 2017 (Year: 2017).*
(Continued)

*Primary Examiner* — Ninos Donabed
(74) *Attorney, Agent, or Firm* — Squire Patton Boggs (US) LLP

(57) ABSTRACT

Communication systems may benefit from more accurate information regarding the passage of data through a network. For example, certain wireless communication systems may benefit from throughput guidance based on user plane insight and optional radio channel information. A method can include monitoring the bandwidth available on at least one of a per data bearer, per application or per transmission control protocol flow basis. The method can also include providing throughput guidance to an entity configured to attempt at least one of transmission control protocol or content level optimization. The throughput guidance can be configured to assist the entity in attempting the at least one of the transmission control protocol or content level optimization.

18 Claims, 10 Drawing Sheets

Related U.S. Application Data

(60) Provisional application No. 62/037,452, filed on Aug. 14, 2014.

(56) References Cited

U.S. PATENT DOCUMENTS

| | | | | |
|---|---|---|---|---|
| 6,829,347 | B1* | 12/2004 | Odiaka | H04Q 3/0083 379/221.06 |
| 8,471,199 | B1* | 6/2013 | Doroshenko | H01J 49/0013 250/281 |
| 8,959,244 | B2* | 2/2015 | Lin | H04L 67/02 725/86 |
| 10,026,101 | B2* | 7/2018 | Cassidy | G06Q 30/0261 |
| 10,104,511 | B2* | 10/2018 | Stewart | H04L 67/12 |
| 2004/0143657 | A1* | 7/2004 | Wu | G06F 11/1451 714/E11.123 |
| 2005/0029713 | A1* | 2/2005 | Wedell | B29C 48/908 264/564 |
| 2005/0091696 | A1* | 4/2005 | Wolfe | H04N 21/2401 725/147 |
| 2005/0188048 | A1 | 8/2005 | Yuan et al. | |
| 2007/0076728 | A1 | 4/2007 | Rieger et al. | |
| 2008/0016151 | A1 | 1/2008 | Howard et al. | |
| 2008/0049786 | A1* | 2/2008 | Ram | H04L 67/1012 370/468 |
| 2008/0056586 | A1* | 3/2008 | Cheng | H04N 19/527 382/232 |
| 2009/0196715 | A1* | 8/2009 | Rebstock | H01L 21/67276 414/222.01 |
| 2009/0196716 | A1* | 8/2009 | Rebstock | B65G 37/02 414/222.01 |
| 2010/0131668 | A1* | 5/2010 | Kamath | H04L 47/32 709/233 |
| 2010/0161741 | A1* | 6/2010 | Jiang | H04L 67/303 709/227 |
| 2010/0209963 | A1* | 8/2010 | Dave | G01N 33/5044 435/325 |
| 2011/0302234 | A1* | 12/2011 | Monk, IV | H04L 43/04 709/227 |
| 2012/0054809 | A1 | 3/2012 | Chowdhury | |
| 2012/0110012 | A1* | 5/2012 | Borsos | H04L 43/0888 707/E17.014 |
| 2013/0100810 | A1 | 4/2013 | Slothouber | |
| 2013/0176854 | A1* | 7/2013 | Chisu | H04W 80/06 370/241 |
| 2013/0301435 | A1* | 11/2013 | Panah | H04W 52/0212 370/252 |
| 2013/0315060 | A1 | 11/2013 | Aybay et al. | |
| 2014/0012981 | A1* | 1/2014 | Samuell | H04L 47/40 709/224 |
| 2014/0029455 | A1* | 1/2014 | Vitthaladevuni | H04W 48/18 370/252 |
| 2014/0066014 | A1* | 3/2014 | Nicholson | H04W 12/088 455/411 |
| 2014/0068713 | A1* | 3/2014 | Nicholson | H04W 12/06 726/3 |
| 2014/0317307 | A1* | 10/2014 | Giladi | H04L 65/80 709/231 |
| 2015/0039635 | A1* | 2/2015 | Monjas Llorente | H04L 47/805 707/754 |
| 2015/0138982 | A1* | 5/2015 | Wei | H04W 72/0493 370/235 |
| 2015/0195625 | A1* | 7/2015 | Ohbitsu | H04N 21/234381 725/126 |
| 2015/0223255 | A1* | 8/2015 | Lakshmi Narayanan | H04L 47/826 370/329 |
| 2015/0282000 | A1* | 10/2015 | Andersson | H04L 65/4092 370/230 |
| 2016/0014620 | A1* | 1/2016 | Narayanan | H04L 67/00 370/253 |
| 2016/0014710 | A1* | 1/2016 | Szilagyi | H04L 61/2503 370/350 |
| 2016/0080502 | A1 | 3/2016 | Yadav | |
| 2016/0234078 | A1* | 8/2016 | Jana | H04L 47/823 |
| 2017/0244639 | A1* | 8/2017 | Szilagyi | H04L 47/12 |

FOREIGN PATENT DOCUMENTS

| | | |
|---|---|---|
| CN | 101803417 A | 8/2010 |
| CN | 102006628 A | 4/2011 |
| CN | 102045321 A | 5/2011 |
| CN | 102300264 A | 12/2011 |
| CN | 102833703 A | 12/2012 |
| CN | 103038652 A | 4/2013 |
| CN | 103299698 A | 9/2013 |
| CN | 103384158 A | 11/2013 |
| CN | 103582029 A | 2/2014 |
| GB | 2 455 978 A | 7/2009 |
| WO | WO 2013/006769 A1 | 1/2013 |

OTHER PUBLICATIONS

Jul. 2, 2019 Office Action issued in Chinese Patent Application No. 201580055587.9.

Dec. 20, 2018 Office Action issued in U.S. Appl. No. 15/527,514.

Notice to File a Response dated Sep. 7, 2018 corresponding to Korean Patent Application No. 10-2017-7006932, and English translation thereof. No copy provided, per MPEP 609. Copy submitted in parent U.S. Appl. No. 15/503,598.

International Search Report and Written Opinion dated Sep. 2, 2015 corresponding to International Patent Application No. PCT/EP2014/074766.

International Search Report and Written Opinion dated Oct. 20, 2015 corresponding to International Patent Application No. PCT/EP2015/068518. No copy provided, per MPEP 609. Copy submitted in parent U.S. Appl. No. 15/503,598.

Notice to File a Response dated Nov. 22, 2018 corresponding to Korean Patent Application No. 10-2017-7016625.

Decision of Rejection dated Feb. 7, 2021 corresponding to Chinese Patent Application No. 201580055587.9, with concise statement of relevance.

"Measuring Network Topology and Bandwidth," Wangluo Tuopu He Daikuan Duliang Jishu Yanjiu, pp. 27-32, Dec. 31, 2013.

Second Office Action dated Mar. 27, 2020 corresponding to Chinese Patent Application No. 201580055587.9, and partial English translation thereof.

Third Office Action dated Sep. 2, 2020 corresponding to Chinese Patent Application No. 201580055587.9, and partial English translation thereof.

Research and implementation of TCP congestion control mechanism in wireless, Tu Hao, Chinese Doctoral Dissertations & Master's Theses Full-text Database (Master) Information Science and Technology, No. 4, pp. 1, 5, 23-60, 2007.

\* cited by examiner

THROUGHPUT GUIDANCE BASED ON USER PLANE INSIGHT

CROSS-REFERENCE TO RELATED APPLICATION

This is a continuation of U.S. patent application Ser. No. 15/503,598, filed on Feb. 13, 2017 which is a 371 of International Patent Application No. PCT/EP2015/068518 filed on Aug. 12, 2015, and claims the benefit and priority of, U.S. Provisional Patent Application No. 62/037,452 filed Aug. 14, 2014, the entirety of which are hereby incorporated herein by reference.

BACKGROUND

Field

Communication systems may benefit from more accurate information regarding the passage of data through a network. For example, certain wireless communication systems may benefit from throughput guidance based on user plane insight and optional control plane and radio channel information.

Description of the Related Art

The majority of the content consumed via mobile devices, such as smartphones, tablets, and the like, originates from Over The Top (OTT) applications and services hosted and available on the Internet, in the clouds or distributed via content delivery networks (CDNs). The user experience of the OTT applications can depend on the efficiency of the data delivery through the mobile network, as well as the selection of the media attributes of the content to be downloaded. Media attributes can include, for example, the media/encoding rate.

The OTT content can be delivered through an interactive communication between the consumer and the server, for example a server of a content provider, whereas the network conditions can be indirectly inferred by the data transmission protocols. The inference can be based on empirical measurements executed at the server side. The empirical measurements can include, for example, round trip time (RTT), detection of data discards, and the like. The client may also send explicit receiver reports (RR) to the server to inform the server about dedicated client side measurements such as loss, delay, jitter, and the like.

Inferring the network status based on such measurements can make end-to-end content delivery suboptimal, as the server can only probe the network for the available resources and indirectly detect whether there are more resources available for the content server's data transmission or whether the network is already overloaded. Such lack of information may lead both to inefficient utilization of the available resources as well as to poor selection of the application level media attributes.

Good user experience of OTT multimedia applications, such as video downloads that generate the majority of the total mobile network traffic, can depend on two conditions: (1) the delivery rate of the content, such as video, web page, or the like, not exceeding the available bandwidth; and (2) efficient utilization of the available bandwidth during the whole content delivery session. The second condition may also be a prerequisite of efficient system operation.

These conditions can be important not only for optimal video delivery but also for any other OTT application. For example, when web page downloads exceeding the available bandwidth eventually trigger discards and retransmissions, the discards and retransmissions can increase the download time and cause user experience degradation.

The available bandwidth may continuously change during the lifetime of an application session or video download due to the fluctuations in the radio channel conditions, the mobility of the users, the activity on the concurrent data connections and the dynamic establishment and deactivation of bearers. Accordingly, the OTT servers can face a challenge of efficiently delivering content through a dynamic network environment about which they do not have enough insight. This inherently can lead to suboptimal performance.

While detailed network events are not known and should not, in the view of network operators, be known to the OTT servers, the OTT servers also have no knowledge of the available bandwidth, forcing the OTT servers to inefficiently probe for the available resources. The available bandwidth, however, would be sufficient information for the OTT servers to pace the content delivery optimally, for example to utilize the available bandwidth efficiently while at the same time not overloading the network.

Inefficient delivery can cause poor customer experience and/or user experience degradations as the time required to download the data is increased. For video downloads, this may even culminate in buffer depletion and stalling. Additionally, the lack of knowledge of the available bandwidth may also cause the improper selection of the content itself, such as starting to download a video with a media rate higher than the available bandwidth. In this case, no matter how optimally the available bandwidth is utilized, the user experience of the video application may still be poor, as downloading the content requires a throughput higher than the available bandwidth.

An additional potential problem with transmission control protocol (TCP) data transmission is that the TCP sender transmits data in bursts, for example a potentially large amount of data may be transferred at line speed, followed by idle periods when the sender waits for acknowledgements (ACKs) from the receiver. When the network buffers are not able to store the entire burst along the delivery path, tail drops may occur, which may cause poor performance, and may require the retransmission of significant amount of data and cause unfairness if multiple TCP connections share the same buffer. The line speed bursts may cause problems even if the overall TCP transmission rate, averaged over the bursts and idle periods, could be supported by the network.

SUMMARY

According to a first embodiment, a method can include monitoring the bandwidth available on at least one of a per data bearer, per application or per transmission control protocol flow basis. The method can also include providing throughput guidance to an entity configured to attempt at least one of transmission control protocol or content level optimization, wherein the throughput guidance is configured to assist the entity in attempting the at least one of the transmission control protocol or content level optimization.

In a variant, the method can also include providing to the entity, in addition to the throughput guidance, context information.

In a variant, the entity may be the entity that performs the at least one of transmission control protocol or content level optimization or another entity, such as a user equipment, that relays the throughput guidance to the entity that performs the at least one of transmission control protocol or content level optimization.

In variant, the context information can include information about other bearers, other applications, demand in a cell or demand at a base station.

In a variant, the monitoring can be performed on a per radio access node basis.

In a variant, the method can be performed in at least one of an evolved node B, a radio application cloud server, or a radio network controller.

In a variant, the monitoring can include monitoring capacity of a plurality of cells, mobility of a plurality of user equipments, and behavior of a radio scheduler.

In a variant, the method can further include estimating the bandwidth available.

In a variant, the estimating can include calculating a fair share of a bearer from a cell's capacity at a given time. The fair share can be the throughput guidance for the bearer.

In a variant, the estimating can include considering at least one of individual per-bearer attributes, throughput requirements of active applications, individual per-bearer limitations, individual per-bearer radio channel condition, individual per-bearer or per-connection measurements based on user plane packet monitoring, and a number of simultaneous transmission protocol control connections in a same bearer.

In a variant, the monitoring can include at least one of control plane monitoring, user plane monitoring, and radio monitoring.

In a variant, throughput guidance can include at least one of application level throughput guidance or transmission control protocol flow level throughput guidance in addition to bearer level throughput guidance According to a second embodiment, a method can include receiving throughput guidance from a throughput guidance entity or user equipment in communication with a throughput guidance entity. The method can also include attempting at least one of transmission control protocol or content level optimization based on the throughput guidance.

According to a third embodiment, a method can include receiving throughput guidance from a throughput guidance entity. The method can also include providing the throughput guidance to another entity configured to attempt at least one of transmission control protocol or content level optimization, wherein the throughput guidance is configured to assist the other entity in attempting the at least one of the transmission control protocol or content level optimization.

In a variant, the providing can include combining the throughput guidance with other control information sent to the other entity.

According to a fourth embodiment, an apparatus can include at least one processor and at least one memory including computer program code. The at least one memory and the computer program code can be configured to, with the at least one processor, cause the apparatus at least to monitor the bandwidth available on at least one of a per data bearer, per application or per transmission control protocol flow basis. The at least one memory and the computer program code can be configured to, with the at least one processor, cause the apparatus at least to provide throughput guidance to an entity configured to attempt at least one of transmission control protocol or content level optimization. The throughput guidance can be configured to assist the entity in attempting the at least one of the transmission control protocol or content level optimization.

In a variant, the at least one memory and the computer program code can be configured to, with the at least one processor, cause the apparatus at least to provide to the entity, in addition to the throughput guidance, context information.

In a variant, the entity may be the entity that performs the at least one of transmission control protocol or content level optimization or another entity, such as a user equipment, that relays the throughput guidance to the entity that performs the at least one of transmission control protocol or content level optimization.

In variant, the context information can include information about other bearers, other applications, demand in a cell or demand at a base station.

In a variant, the at least one memory and the computer program code can be configured to, with the at least one processor, cause the apparatus at least to monitor on a per radio access node basis.

In a variant, the apparatus can be at least one of an evolved node B, a radio application cloud server, or a radio network controller.

In a variant, the at least one memory and the computer program code can be configured to, with the at least one processor, cause the apparatus at least to monitor capacity of a plurality of cells, mobility of a plurality of user equipments, and behavior of a radio scheduler.

In a variant, the at least one memory and the computer program code can be configured to, with the at least one processor, cause the apparatus at least to estimate the bandwidth available.

In a variant, the at least one memory and the computer program code can be configured to, with the at least one processor, cause the apparatus at least to estimate by calculating a fair share of a bearer from a cell's capacity at a given time, wherein the fair share is the throughput guidance for the bearer.

In a variant, the at least one memory and the computer program code can be configured to, with the at least one processor, cause the apparatus at least to estimate by considering at least one of individual per-bearer attributes, throughput requirements of active applications, individual per-bearer limitations, individual per-bearer radio channel condition, individual per-bearer or per-connection measurements based on user plane packet monitoring, and a number of simultaneous transmission protocol control connections in a same bearer.

In variant, the at least one memory and the computer program code can be configured to, with the at least one processor, cause the apparatus at least to monitor by at least one of control plane monitoring, user plane monitoring, and radio monitoring.

In a variant, throughput guidance can include at least one of application level throughput guidance or transmission control protocol flow level throughput guidance in addition to bearer level throughput guidance According to a fifth embodiment, an apparatus can include at least one processor and at least one memory including computer program code. The at least one memory and the computer program code can be configured to, with the at least one processor, cause the apparatus at least to receive throughput guidance from a throughput guidance entity or user equipment in communication with a throughput guidance entity. The at least one memory and the computer program code can also be configured to, with the at least one processor, cause the apparatus at least to attempt at least one of transmission control protocol or content level optimization based on the throughput guidance.

According to a sixth embodiment, an apparatus can include at least one processor and at least one memory including computer program code. The at least one memory and the computer program code can be configured to, with the at least one processor, cause the apparatus at least to receive throughput guidance from a throughput guidance entity. The at least one memory and the computer program code can also be configured to, with the at least one processor, cause the apparatus at least to provide the throughput guidance to another entity configured to attempt at least one of transmission control protocol or content level optimization, wherein the throughput guidance is configured to assist the other entity in attempting the at least one of the transmission control protocol or content level optimization.

In a variant, the at least one memory and the computer program code can also be configured to, with the at least one processor, cause the apparatus at least to combine the throughput guidance with other control information sent to the other entity.

According to a seventh embodiment, an apparatus can include means for monitoring the bandwidth available on at least one of a per data bearer, per application or per transmission control protocol flow basis. The apparatus can also include means for providing throughput guidance to an entity configured to attempt at least one of transmission control protocol or content level optimization. The throughput guidance can be configured to assist the entity in attempting the at least one of the transmission control protocol or content level optimization.

In a variant, the apparatus can further include means for providing to the entity, in addition to the throughput guidance, context information.

In a variant, the entity may be the entity that performs the at least one of transmission control protocol or content level optimization or another entity, such as a user equipment, that relays the throughput guidance to the entity that performs the at least one of transmission control protocol or content level optimization.

In a variant, the context information can include information about other bearers, other applications, demand in a cell or demand at a base station.

In a variant, the monitoring can be performed on a per radio access node basis.

In a variant, the apparatus can be at least one of an evolved node B, a radio application cloud server, or a radio network controller.

In a variant, the monitoring can include monitoring capacity of a plurality of cells, mobility of a plurality of user equipments, and behavior of a radio scheduler.

In a variant, the apparatus can further include means for estimating the bandwidth available.

In a variant, the estimating can include calculating a fair share of a bearer from a cell's capacity at a given time, wherein the fair share is the throughput guidance for the bearer.

In a variant, the estimating can include considering at least one of individual per-bearer attributes, throughput requirements of active applications, individual per-bearer limitations, individual per-bearer radio channel condition, individual per-bearer or per-connection measurements based on user plane packet monitoring, and a number of simultaneous transmission protocol control connections in a same bearer.

In a variant, the monitoring can include at least one of control plane monitoring, user plane monitoring, and radio monitoring.

In a variant, throughput guidance can include at least one of application level throughput guidance or transmission control protocol flow level throughput guidance in addition to bearer level throughput guidance According to an eighth embodiment, an apparatus can include means for receiving throughput guidance from a throughput guidance entity or user equipment in communication with a throughput guidance entity. The apparatus can also include means for attempting at least one of transmission control protocol or content level optimization based on the throughput guidance.

According to a ninth embodiment, an apparatus can include means for receiving throughput guidance from a throughput guidance entity. The apparatus can also include means for providing the throughput guidance to another entity configured to attempt at least one of transmission control protocol or content level optimization. The throughput guidance can be configured to assist the other entity in attempting the at least one of the transmission control protocol or content level optimization.

In a variant, the providing can include combining the throughput guidance with other control information sent to the other entity.

A non-transitory computer-readable medium can be encoded with instructions that, when executed in hardware, perform a process. The process can correspond to the method according the first, second, or third embodiment, in any of their variants.

A computer program product can encode instructions for performing a process. The process can correspond to the method according the first, second, or third embodiment, in any of their variants.

BRIEF DESCRIPTION OF THE DRAWINGS

For proper understanding of the invention, reference should be made to the accompanying drawings, wherein.

DETAILED DESCRIPTION

Good user experience right from the beginning of the application sessions may benefit from the over-the-top (OTT) server having explicit information or insight into the available bandwidth. As mentioned above, currently the OTT servers can execute end-to-end measurements at their location and potentially can request the mobile devices to provide additional measurement feedback. The mobile device itself can also periodically send receiver reports (RRs) to the server without explicit request from the server. However, the valuable information of what happens within the mobile operator's network segment (most importantly, on the radio interface) is not available as both the server and the receiver can only infer the actual conditions from end-to-end measurements.

Figure 1:
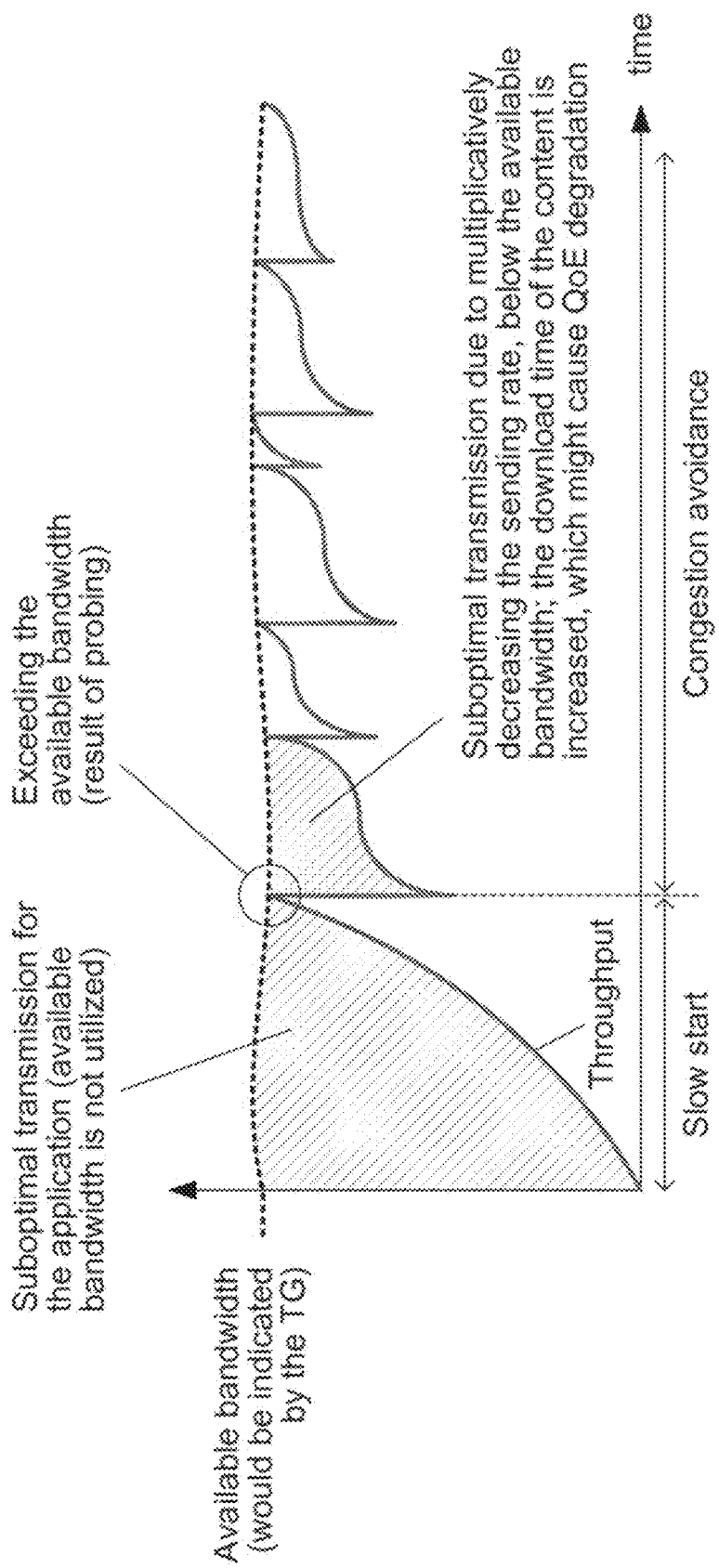
FIG. 1 illustrates inefficient utilization of the available resources.

FIG. 1 illustrates inefficient utilization of the available resources. As shown in FIG. 1, inefficient utilization can include a slow start and the use of congestion avoidance. During slow start, throughput may be much less than the available bandwidth. Moreover, probing of the available bandwidth can lead to exceeding the available bandwidth. In turn, suboptimal transmission due to decreased sending rate can occur when the server overcorrects for overshooting the available bandwidth. This decreased rate can increase download to of the content and a reduction of quality of experience (QoE) for the user.

Real time insight from within mobile systems may help content servers further optimize their content delivery. The insight may include a direct indication of the bandwidth available for a given service, application, bearer or individual flow referred to as the Throughput Guidance (TG). As such information is not available from end-to-end measurements, the only insight conventionally available to the OTT servers, alternative means can be provided.

One approach, according to certain embodiments, is for one or more in-line network elements, such as an evolved Node B (eNB), a Radio Network Controller (RNC) or a Nokia radio application cloud server (RACS), of Nokia Solutions and Networks Oy, to collect the required insight through network side measurements and calculations and transfer the insight to the OTT servers.

Currently, for most applications, the content delivery uses the Transmission Control Protocol (TCP) as transport layer protocol, which operates without having a priori knowledge on the bandwidth available in the end-to-end path. Therefore, by design, TCP uses adaptive mechanisms to increase the transmission rate while there is no congestion and to decrease the sending rate upon congestion. Congestion inferred by detecting packet losses in TCP. Thus, conventionally the TCP source is probing the available network capacity.

Probing may be a reasonable mechanism when no additional information is available. By contrast, in the presence of throughput guidance entity (TGE) that is able to signal an accurate estimation of the available bandwidth in the system, the TCP data transmission could be significantly improved by, for example, speeding up the initial slow start phase, implementing smarter reactions for lost segments, and properly pacing the data segments instead of transmitting bursts at line speed. In addition to TCP level optimization, the transmitted multimedia data itself could also be optimized based on the throughput guidance, for example, with respect to media rate selection, video/audio rate adaptation, transcoding, and the like.

Accordingly, the throughput guidance provided by the network can enable optimization on two levels. The first level of optimization can be the transport layer, for example TCP. The second level of optimization can be the application layer, for example multimedia. These optimizations can be performed by the OTT server by optimizing only one of the layers or by optimizing both of the layers.

Figure 2:
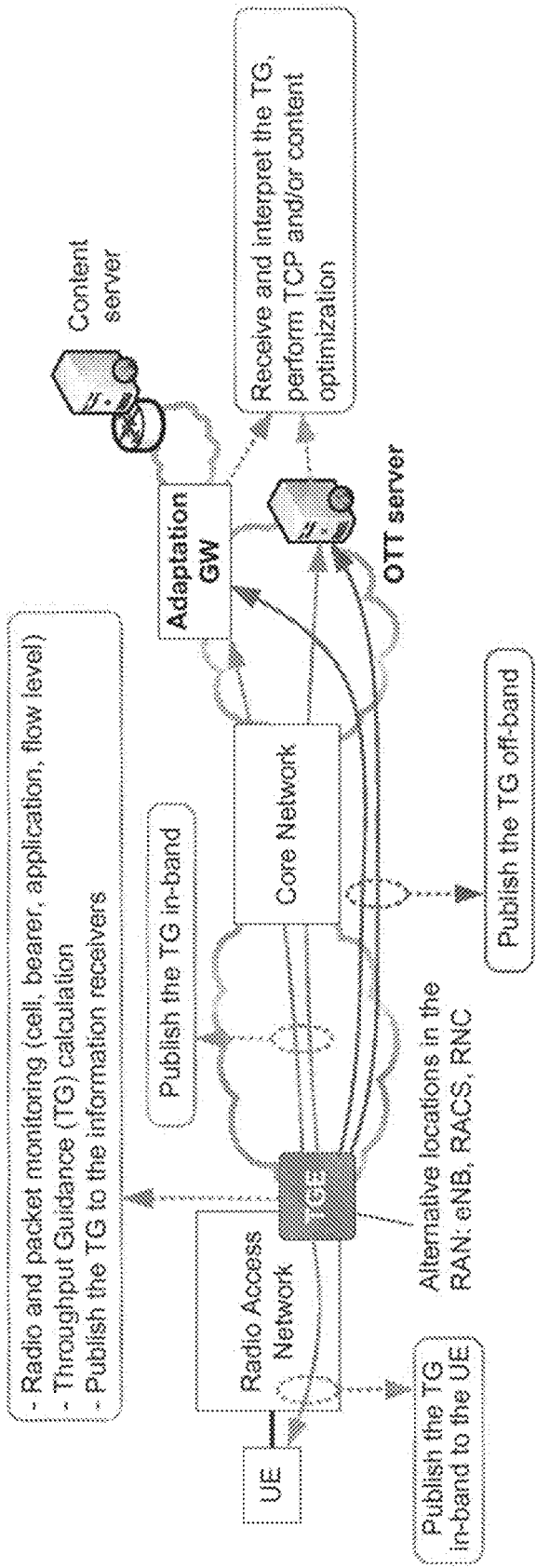
FIG. 2 illustrates a throughput guidance entity according to certain embodiments.

FIG. 2 illustrates a throughput guidance entity according to certain embodiments. Certain embodiments provide for throughput guidance by providing a throughput guidance entity (TGE), as well as a method to calculate the throughput guidance and a mechanism to publish the calculated throughput guidance. The throughput guidance can be calculated per TCP flow, per application or per bearer level. The calculated throughput guidance can be published in-band or off-band to the OTT server or adaptation gateway (GW). The per bearer guidance can be useful in case the receiver of the throughput guidance terminates or intercepts the entire traffic of the bearer of the user equipment (UE). Alternatively, it can be assumed that the UE runs a single application per bearer, which may consume all resources available for the bearer. The per TCP flow and per application guidance may be used when there are multiple applications or servers from which a given UE is simultaneously downloading content. Using the per bearer guidance in that case could overbook the network resources as both servers may start sending data at the full bandwidth available for the bearer.

As shown in FIG. 2, the throughput guidance entity can be located at the boundary of the radio access network and the core network, such as in an eNB, RACS, or RNC. In addition to publishing to the adaptation gateway or OTT server, the throughput guidance entity can publish the throughput guidance to a user equipment.

Thus, certain embodiments identify possible locations and deployment possibilities for the throughput guidance entity within a mobile system. These locations and deployment possibilities can provide full access to the information required for the throughput guidance calculation.

Certain embodiments also or alternatively provide a throughput guidance calculation method for each possible aggregation level, for example per TCP flow, application or bearer. Moreover, certain embodiments describe possible ways, both in-band and off-band, of conveying the throughput guidance to the corresponding OTT server.

Certain embodiments also or alternatively provide guidance on the usage of the throughput guidance, such as TCP and application layer optimization mechanisms enabled at the OTT server, adaptation GW, and the like, based on the throughput guidance.

Certain embodiments apply to long term evolution (LTE) systems with implementation possibility directly in the eNB or on the RACS as well as wideband code division multiple access (WCDMA)/high speed packet access (HSPA) systems with possible implementation in the RNC. The throughput guidance calculation can be based on user plane measurements and the standard as well as manufacturer-specific operation of the LTE/third generation (3G) radio quality of service (QoS) architecture. The throughput guidance can also incorporate radio measurements when available. With a method according to certain embodiments, the per bearer, TCP flow or application throughput guidance can be available immediately after the establishment of a new bearer, TCP flow or application. The new throughput guidance can be continuously updated during the entire lifetime of the bearer, TCP flow or application. Thus, the throughput guidance may permit dynamic adaptation of the content transfer to the actual system conditions.

The throughput guidance can be exposed to the information receivers either in-band via protocol header enrichment using, for example optional/additional fields in the TCP, IP or HTTP headers, or via a dedicated off-band control connection. The receiver of the throughput guidance can be any entity that aims at TCP and/or content level optimization. For example, the entity can be an OTT server, content delivery network (CDN) node, origin server, adaptation gateway acting as a middle box, or the like. The UE itself may also be an information receiver. In such a case the UE can combine the received insight into other control information sent to the server. In this case, the server may receive the insight via regular UE reports. Alternatively or in addition, the UE can use the received insight locally to make decisions or trigger actions, such as to explicitly request a particular media rate adaptation from the server.

In addition to the throughput guidance, the throughput guidance entity can also provide, via the same header enrichment mechanism or via the off-band connection, any additional context information available at the location of the throughput guidance calculation that can improve the accuracy of context aware higher layer optimization mechanisms, such as video rate adaptation. The context information can include, for example, information about the other bearers/applications, the demand in the cell/eNB, or the like.

Throughput guidance can be configured to permit efficient bandwidth utilization of the content server. Based on the throughput guidance, the content server can perform TCP level as well as content level optimization and the content server can select the appropriate content format accordingly that matches the available bandwidth. The optimization based on an accurate throughput guidance may be able to provide real, tangible performance and QoE improvements. These improvements may include, for example, decreasing the time to start the playback of a video, reducing or eliminating the number and duration of stallings, decreasing the download time of web pages, or the like. Additionally, there may also be a gain as the OTT server and the UE may operate more efficiently also on the protocol level, as there may be no, or less, need to deal with retransmissions or buffer out-of-order segments.

Thus, certain embodiments provide a functional entity referred to as the throughput guidance entity (TGE). The throughput guidance entity can be a software entity running on or attached to a radio access node of a mobile network. The scope of the throughput guidance entity can be to continuously estimate and monitor the bandwidth available for each data bearer, application or TCP flow served by the radio access node in the network and convey this information to the OTT server that is transmitting data in the corresponding bearer. The network side insight on the available bandwidth is referred to as the Throughput Guidance (TG). Based on the throughput guidance, the OTT servers are able to perform TCP optimization as well as content level optimization to improve the user experience of their applications. Possible deployment locations for the throughput guidance entity are the eNB or the RACS in LTE and the RNC in WCDMA/HSPA systems.

The throughput guidance can first be calculated on the data bearer level, which can then be used as an input for deriving the per-application and per-flow throughput guidance values. Accurate estimation of the per-bearer available bandwidth or bearer level throughput guidance may require that the throughput guidance entity be aware of the available resources in the network, such as the capacity of the radio cells. Accurate estimation of the per-bearer available bandwidth or bearer level throughput guidance may require that the throughput guidance entity be aware of the set of bearers competing for the same resources and the resource scheduling scheme that defines how the resources are allocated to the competing bearers.

The throughput guidance entity can monitor the capacity of the cells, the mobility of the UEs and it is aware of the behavior of the radio scheduler. The required information is available to the throughput guidance entity due to its unique location at a radio access node. The insight can enable the throughput guidance entity to estimate a fair share of each bearer from the cell's capacity at any given time. The bearer's fair share can be a reasonable candidate for its throughput guidance as the fair share may be the target of the radio scheduler whenever there is data to be transmitted in the bearer. In addition to the fair share estimation, the individual per-bearer attributes such as QoS parameters, the active applications and their throughput requirements, as well as individual per-bearer limitations such as radio channel degradation, can also be detected, collected and taken into account by the throughput guidance entity in order to update and refine the throughput guidance for each data bearer. The throughput guidance entity calculates and updates the throughput guidance for each bearer continuously in real time based on the combination of all available sources of information, with a high flexibility on providing reasonably accurate estimations even under limited set of information, such as when there is no explicit insight into the radio conditions at all. The throughput guidance entity may be configured to provide a throughput guidance for a bearer immediately after the bearer has been established.

The throughput guidance entity can also calculate the TCP flow level and application level throughput guidance values in addition to the bearer level throughput guidance. These values can be derived from the bearer level throughput guidance and additional measurements such as the number of simultaneous TCP connections in the same bearer, their individual status and the detected applications.

The TCP and application level throughput guidance values can have particular value when there are multiple applications run by a same UE generating traffic in a same bearer, downloading content from separate OTT servers and thus being in the scope of TCP and/or application layer optimization executed by separate entities. There can be multiple valid approaches for distributing the per bearer available throughput among the competing TCP flows or applications in the bearer, such as to enforce per TCP flow fairness, share the bandwidth according to the demand of the applications, or based on any other policy. The policy may be supplied by a network operator.

The throughput guidance can be conveyed from the throughput guidance entity to the OTT server via at least one of at least two alternatives: using in-band protocol header enrichment of the uplink user plane packets themselves or via a dedicated off-band connection established between the throughput guidance entity and the OTT server or other information receiver. Header enrichment can be an efficient mechanism that piggybacks information on the user plane packets. In this way, additional information can be received by the OTT server with full context including, for example, the UE, flow, and application identity. An off-band connection may be required when the arrival of the in-band enriched information is not guaranteed, such as due to intermediate firewalls stripping off the extra protocol headers. The throughput guidance information transmitted via the off-band connection may be accompanied by additional context information to identify the connection to which it corresponds, as well as to synchronize the throughput guidance with the progress/status of the data download within the flows.

Regardless of the mechanism used to convey the throughput guidance, the receiver of the throughput guidance may be able to perform TCP optimization as well as content level optimization. Valid TCP optimization mechanisms include at least the following, although multiple ones of the following may be used simultaneously or sequentially: eliminating the slow start phase of the TCP connection and starting to send data at the rate designated by the throughput guidance, that is by setting the initial window according to the throughput guidance; bypassing the linear/cubic increase function normally used to manage the TCP transmission rate during the congestion avoidance phase and sending the data at the rate indicated by the latest throughput guidance or a statistical combination of past throughput guidance values; eliminating or relaxing the multiplicative decrease mechanism from the TCP congestion avoidance to keep the data transmission rate according to or close to the throughput guidance even in the presence of sporadic losses; or pacing the transmission of the TCP data segments according to the throughput guidance instead of sending the data in bursts and waiting for the ACKs from the TCP receiver.

Valid optimization mechanisms on the content/application level include at least the following, which may be used alone or in combination with one another: guided selection of the content with a media rate not exceeding the throughput guidance, which may be possible as the throughput guidance may be already available at the beginning of the data transfer; switch to a lower resolution content by the OTT/content server during content download in case the throughput guidance indicates a decrease in the available bandwidth; adapt the media on-the-fly at a middle box, such as a content optimizer, according to the throughput guidance without the knowledge of the OTT/content server; or, for HTTP progressive download with chunk based video delivery, select the media rate of each chunk according to the throughput guidance.

Both TCP and content level optimizations may be implemented and active at the same time.

Alternatively, the throughput guidance can be transmitted to the UE instead of the OTT server, using in-band protocol header enrichment of the downlink user plane packets. This may require that the UE or an application running on the UE is able to receive the throughput guidance from the packet headers, as well as interpret the throughput guidance and act upon it. Thus, UE side modification may be needed in certain embodiments. Possible actions from the UE may be to request for explicit media rate adaptation from the OTT server via the mechanisms built into the media delivery protocol, such as standard receiver reports in case of UDP streaming or proprietary client-server signaling, or to combine the throughput guidance as an additional information element into the UE's feedback messages sent to the OTT server. In the latter case, the OTT server may still be responsible for the optimization thus both TCP and content level optimizations are possible. In the former case, the UE as a TCP receiver may not be in a position to perform TCP optimization for the downlink traffic. Consequently, only content level adaptation may be possible.

As mentioned above, the throughput guidance entity can be a functional entity running at the RACS or integrated into the eNB or into the RNC to provide, for example, per-bearer throughput guidance such as information on the bandwidth available for each bearer, as well as per-flow and per-application level throughput guidance.

In a RACS based implementation, the throughput guidance entity may have access to the user plane data flows as well as to certain control plane information and radio measurements transferred from an eNB to the RACS. Alternatively, the eNB and RNC side implementations can provide even deeper integration opportunity and full access to the radio resource management and scheduler functionalities.

In the following discussion, the RACS based deployment is discussed in detail first, followed by the eNB and RNC side implementations. Finally, the mechanism used to publish the throughput guidance to the OTT servers is discussed, which can be independent from the deployment and implementation of the throughput guidance entity.

In a RACS side implementation, a throughput guidance entity can be implemented as a RACS based application that is configured to collect insight from two main sources: first, from the monitoring of the user plane packet flow, and second, by subscribing to control plane and radio measurement events, provided by the RACS platform. Therefore, the throughput guidance entity can rely on control plane, user plane, and radio monitoring as inputs to the throughput guidance calculation.

Figure 3:
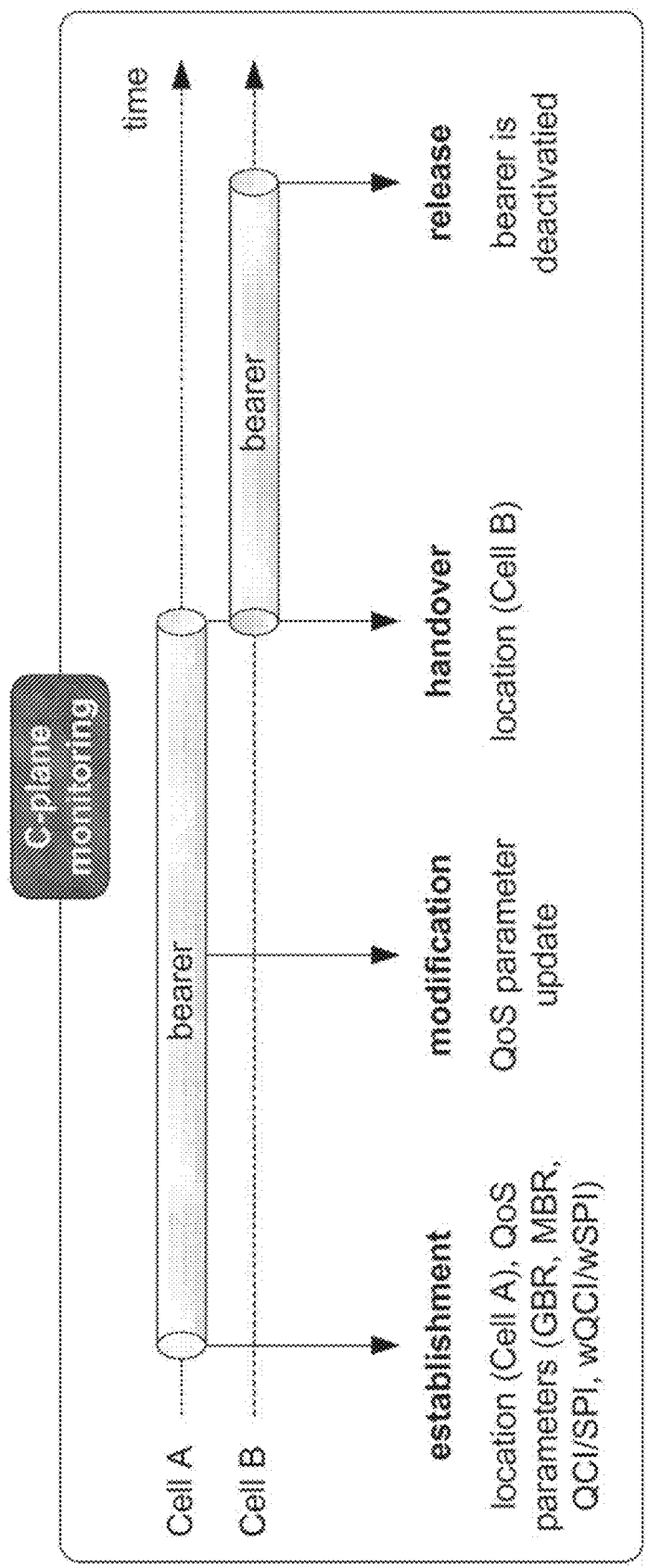
FIG. 3 illustrates control plane events monitored by a throughput guidance entity, according to certain embodiments.

FIG. 3 illustrates control plane events monitored by a throughput guidance entity, according to certain embodiments. The control plane events collected by the throughput guidance entity can include bearer establishment, modification, release as well as user mobility events. The bearer events can be used to detect or update the bearer's QoS parameters, such as QoS class identifier (QCI), guaranteed bit rate (GBR), minimum bit rate (MBR), or the like, and initial location on the cell level. The mobility events, such as handovers, can be used to maintain up-to-date information about the UE/bearer's current location. Thus, the throughput guidance entity may always be aware which bearers are established and active under each cell.

Figure 4:
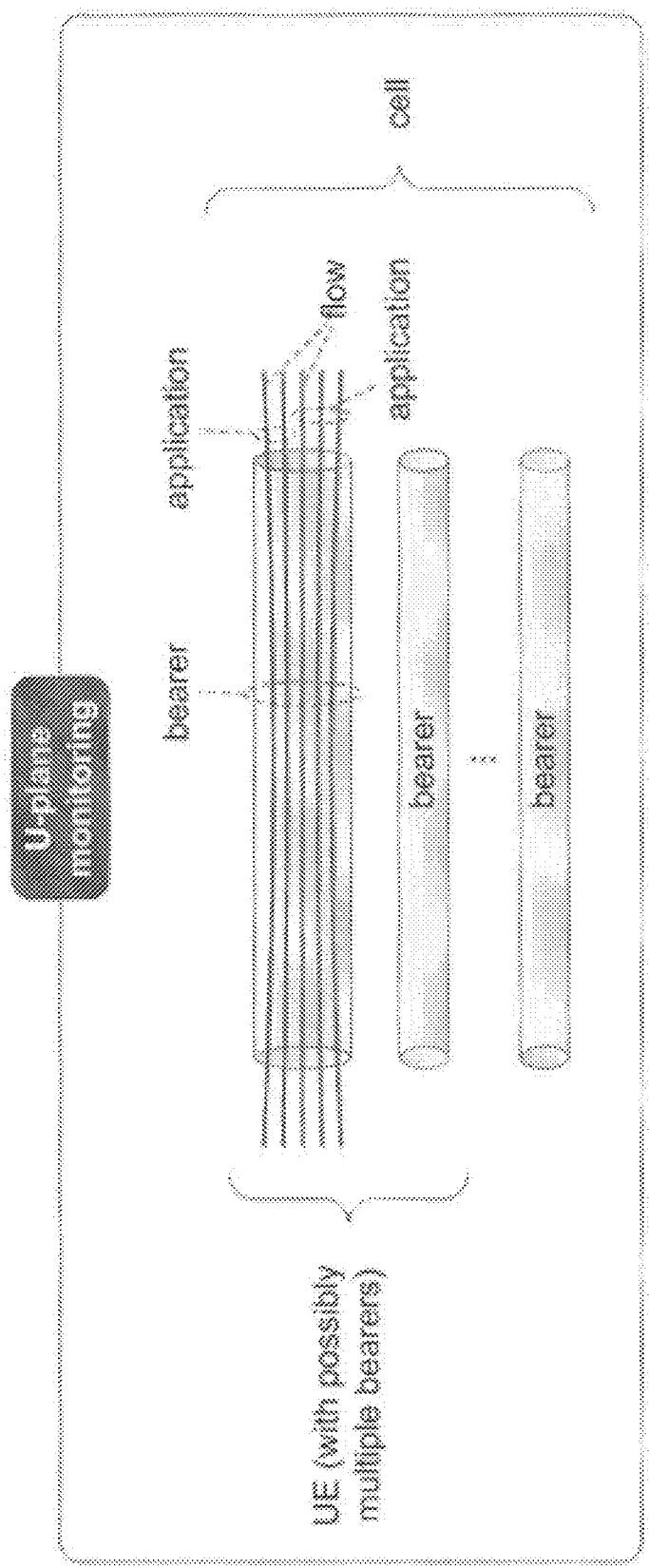
FIG. 4 illustrates user plane measurements on various aggregation levels performed by a throughput guidance entity, according to certain embodiments.

FIG. 4 illustrates user plane measurements on various aggregation levels performed by a throughput guidance entity, according to certain embodiments. The throughput guidance entity can intercept the user plane packets in the bearers in downlink and uplink to detect the establishment of new TCP connections and non-TCP flows, as well as to identify applications and perform user plane measurements, such as measurements of throughput, RTT, loss, and the like, in the active bearers. The measurements can be performed on the individual flow level as well as on the application, bearer and cell aggregates. The bearer level measurements can be required to calculate the per bearer throughput guidance, which is the baseline from which the per-flow and per-application throughput guidance are derived.

Figure 5:
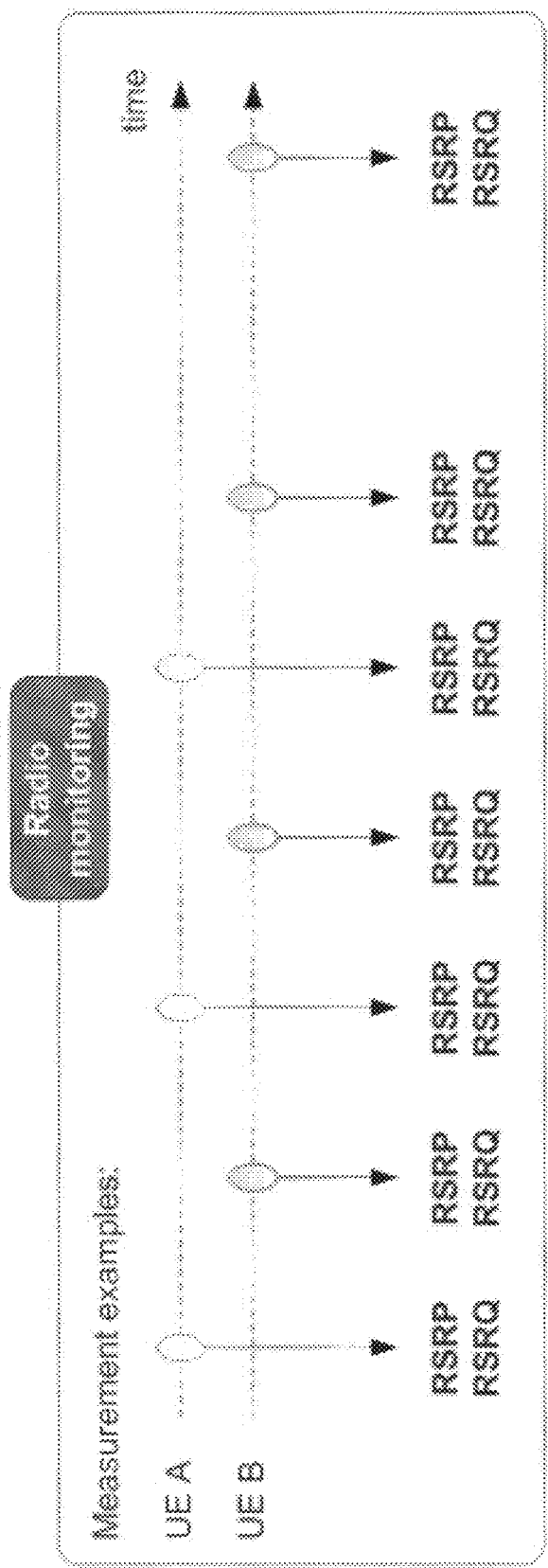
FIG. 5 illustrates radio measurements collected by a throughput guidance entity, according to certain embodiments.

FIG. 5 illustrates radio measurements collected by a throughput guidance entity, according to certain embodiments. When the UEs are configured by the radio access network (RAN) via radio resource control (RRC) to report radio channel measurements, the measurements can also be collected by the throughput guidance entity as an additional input for the throughput guidance calculation. Examples of the radio measurements are shown in FIG. 5. The collected radio measurements may include radio channel quality reports (RSRP, RSRQ), timing advance or any other radio interface related information.

Figure 6:
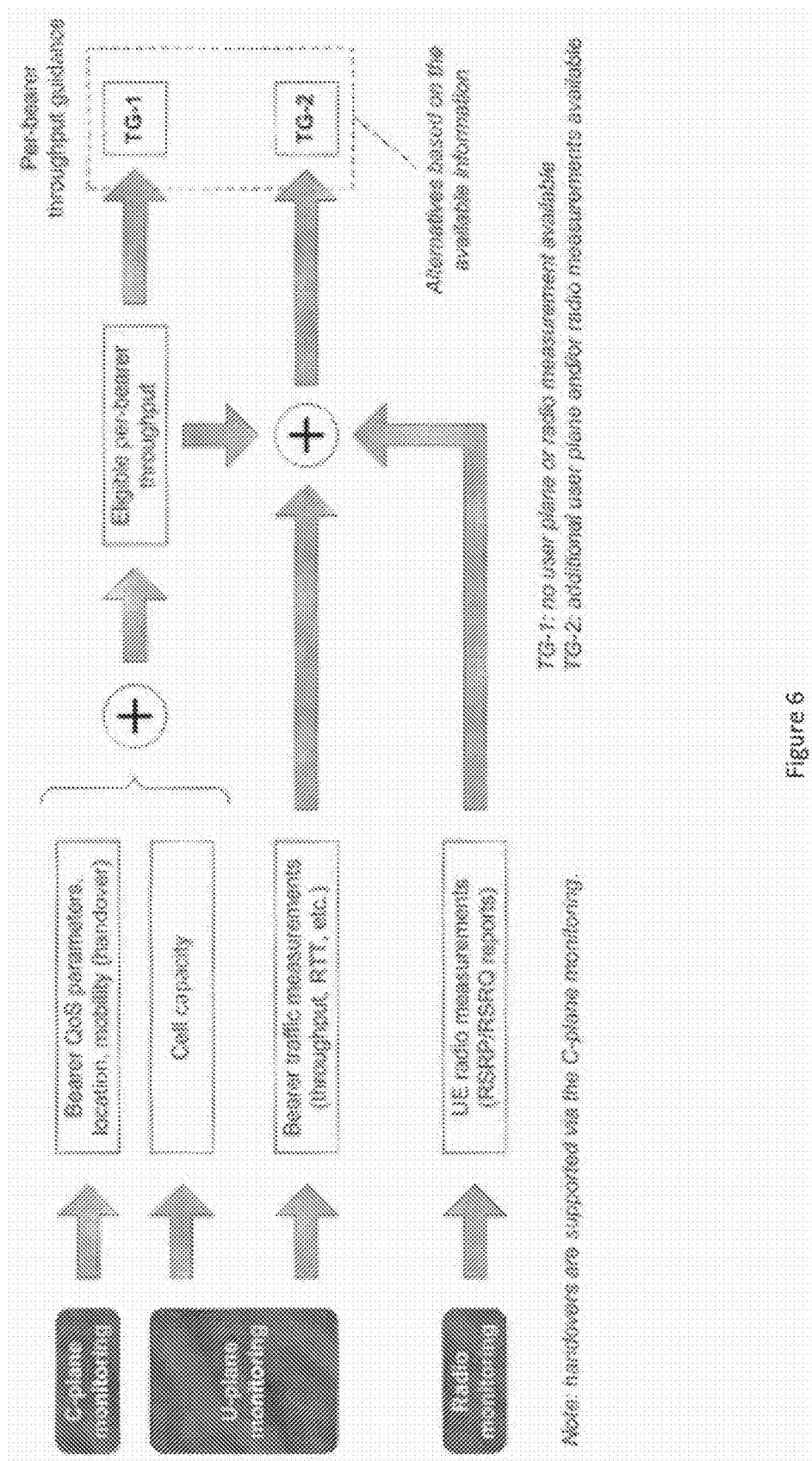
FIG. 6 illustrates throughput guidance calculation by a throughput guidance entity, according to certain embodiments.

FIG. 6 illustrates throughput guidance calculation by a throughput guidance entity, according to certain embodiments. High level logic of a per-bearer throughput guidance calculation is shown in FIG. 6. Knowing each cell's capacity and the set of bearers competing for its resources, the throughput guidance entity can calculate and maintain an eligible throughput for each bearer. The eligible throughput can be the fair share of the given bearer from the available cell capacity considering the number of active bearers in the same cell and their QoS parameters.

When there is no additional information available for a given bearer, the bearer's throughput guidance can be based on the eligible throughput. As soon as additional insight becomes available, such as the achieved throughput of the bearer or explicit information about the bearer's radio channel quality, this additional insight can be used by the throughput guidance entity to update the throughput guidance of the bearer.

During the lifetime of the bearer, the number of bearers, their QoS class, the location of the users and the cell capacity may all change. For example, when a new bearer is established, the available bandwidth may immediately decrease for the already ongoing bearers. The throughput guidance entity may continuously update the throughput guidance to reflect the latest status of the cell and the bearer. Therefore, the throughput guidance may remain an accurate indicator during the entire lifetime of each bearer.

Intra-eNB handovers can also be handled by the same RACS/throughput guidance entity. The entity can be informed about the handover via a platform's message bus, such as C-plane monitoring events, and the throughput guidance entity can update the throughput guidance of all affected bearers, including bearers both in the source and target cells. Inter-eNB handovers can terminate the radio data bearer, such as the E-RAB, at the source eNB and establish a new one at the target eNB. These events can also be detected by the throughput guidance entity in the source and target eNB's RACS via the message bus. The throughput guidance entity in the source eNB's RACS can stop calculating the throughput guidance for the traffic in the terminated bearer and can update the throughput guidance of the remaining bearers based on the changes.

The throughput guidance entity in the target eNB's RACS can immediately calculate the throughput guidance for the new bearer based on the new bearer's eligible throughput and can update the throughput guidance of the already established bearers as well. Consequently, continuous calculation of the bearer level throughput guidance can also be ensured after handover at the target throughput guidance entity.

Accurate calculation of the flow and application level throughput guidance at the target throughput guidance entity may require instant knowledge about the number and identity, such as application, of the established flows. Additionally, the knowledge of whether a given server is eligible to receive the calculated throughput guidance on any level may also be required at the target eNB. The target throughput guidance entity can be provided with the required information via two alternatives. First, the source throughput guidance entity may enrich the information, such as the flow's application, calculated throughput guidance, and the like, in the DL direction into the packet's protocol headers in each flow. In case of a handover, the packets buffered at the source eNB can be forwarded to the target eNB via the X2 interface.

When the forwarded traffic is routed through the target throughput guidance entity, the target throughput guidance entity can read the information from the packet headers and can continue to calculate the throughput guidance at each level and act accordingly. The success of this mechanism may depend on whether there is ongoing data transmission and in-flight data buffered at the source eNB for each flow when the handover happens. Otherwise, no packets would be forwarded to the target eNB, at least not for all existing flows.

A second mechanism can be implemented that may guarantee the delivery of potentially required information from the source RACS/throughput guidance entity to the target RACS/throughput guidance entity. This mechanism may require a per-bearer explicit context transfer including the number of flows, the identity of the corresponding applications, the eligibility of the servers for receiving the throughput guidance, or the like, via an off-band connection. The connection can be a logical point-to-point connection established between adjacent RACS instances or each RACS/throughput guidance entity can have an established connection to a backend concentrator/mediator server, which can relay information between two RACS instances in a star topology. The data transfer through the off-band connection can be originated proactively by the source RACS/throughput guidance entity as soon as it is informed about the handover.

There can be various implementation details as to the cell capacity measurement, eligible throughput calculation, and throughput guidance calculation, as well as methods to take into account the additional input, such as per-bearer traffic measurements and radio channel quality information, to refine the throughput guidance.

To obtain an accurate throughput guidance calculation, it may be useful to maintain an accurate measurement of the capacity of each cell. The throughput that a given cell can provide may be a dynamic value, depending on the radio configuration, such as allocated radio bandwidth, as well as the momentary radio conditions, the number of users, and the mobility of the users. Therefore, the throughput guidance entity can obtain the cell capacity via actually measuring the cumulative cell level throughput. The current cell level throughput may not be an accurate indication of the cell capacity at any time. If the applications of the users are not downloading considerable amount of data, the measured cell level throughput may be low, but a new or existing bearer may be able to achieve higher throughput. In order to avoid false cell capacity assessment, the throughput guidance entity may only take a cell level throughput measurement as a capacity measurement when the available radio resources in the cell are fully utilized.

Full utilization of available radio resources may be detected in two ways: based on user plane measurement or based on explicit radio resource management (RRM) information. User plane measurement may involve monitoring the RTT and packet loss of the flows separately in the downstream (UE-TGE) and upstream (TGE-server) network segments as well as the end-to-end RTT and packet loss (UE-server). When the downstream segment is the main contributor to the end-to-end RTT and loss, then the radio interface may be congested and the currently measured throughput may equal the momentary cell capacity. When such a scenario is detected by the throughput guidance entity, the cell level throughput measurements can be taken by the throughput guidance entity to update the cell capacity.

Alternatively, full radio utilization can also be detected from explicit RRM information if the information indicates that all physical resource blocks (PRBs) are utilized on the radio interface and the radio buffers have data to transmit. Such information may be available from the RACS platform via the Radio Network Information Service. In such cases, the measured cell level throughput can be the momentary cell capacity. The throughput guidance entity can act by updating the cell capacity accordingly.

The calculation of the per bearer throughput guidance may depend on whether the bearer has just been established, whether it is after an idle period, or whether there is ongoing data download. A difference is that an ongoing download may enable bearer level throughput measurement, which is not available in the former cases.

The per bearer throughput guidance calculation after bearer establishment or after an idle period, namely without the availability of throughput measurements, may require identification of the bearer's fair share, which may be the bearer's eligible throughput. Assuming each bearer j has an associated weight $w_j$ and guaranteed bitrate $GBR_j$, at the scheduler and C is the momentary cell capacity, the eligible throughput of bearer i may be defined according to the following formula:

$$E_i = GBR_i + \frac{w_i}{\sum_j w_j} \cdot \max\left(0, C - \sum_j GBR_j\right)$$

This formula expresses that the packet scheduler first serves the GBR bearers up to their guaranteed bitrate and the rest of the remaining capacity, if any, is distributed among the bearers in proportion to their scheduling weight. Additionally, in case the bearer has also a maximum bitrate configured, the eligible throughput must be capped to that value.

Assuming that the UE establishing the bearer has reasonably good radio conditions, the radio scheduler may enforce this rate once data transmission starts. Therefore, the throughput guidance of the bearer could be the eligible throughput itself. When the bearer has been established by a UE having poor individual radio channel quality, the eligible throughput may not be achievable later. In such a case, the throughput guidance may be set to be smaller than the eligible throughput. Accordingly, the throughput guidance for bearer i can be derived from the eligible throughput according to the following formula:

$$TG_i = alpha_i \cdot E_i$$

where alpha is a bearer specific multiplier not exceeding 1. Selecting the alpha in order to compensate for poor individual radio cannel quality can be based on the radio side RTT measurement of the new TCP connection established in the bearer.

After the TCP handshake is completed, the first RTT measurement may already be available and can be compared to the RTT measurement of the other already established bearers. The radio side RTT can depend on the radio channel quality, as the latter can select the modulation scheme and coding rate used at the physical radio interface and can constrain how fast data can be transferred through the radio link. Therefore, in case the new or so far idle bearer is an outlier with a significantly higher RTT on the radio side, such a situation may be indicative of a relatively lower radio channel quality for the corresponding UE. The higher the RTT compared to the other bearers, the lower can be the alpha selected for the new bearer.

After data transmission has started, the throughput guidance entity can continuously measure the achieved throughput in the bearer and can verify whether the eligible throughput was actually reached. When the measurements indicate that the bearer has reached or even exceeded the eligible throughput, the throughput guidance can remain at the eligible throughput. It may be useful for the throughput guidance never to be increased above the eligible throughput, as any available excess throughput may only be the result of other bearers not claiming their fair share. However, at the moment data transfer starts in the other bearers, the radio scheduler would provide them with their fair share, leaving only the eligible throughput for the given bearer.

When the throughput measurement indicates that the bearer could not reach the bearer's eligible throughput, the throughput guidance may need to be decreased to the actually available throughput. Low throughput may have multiple reasons: UE side limitation, using an application with a low traffic profile, such as downloading only a limited amount of data, or having individual radio channel degradation. Only the individual channel degradation may, in certain embodiments, result in decreasing the throughput guidance for the bearer.

A UE side limitation can be detected by monitoring the TCP advertised window sent by the UE in the UL ACKs. A decreasing tendency in the AWND value may indicate that the UE's processing is throttled and consequently the UE may not be able to consume the data at the rate the data is received. Such a situation may not result in decreasing the throughput guidance, as it may be the scope of the TCP sender and not the throughput guidance, to react to UE side limitations. This limitation on the UE may also be visible to the TCP sender. An application downloading only a limited amount of data can be detected by monitoring the TCP sequence and ACK numbers. When the flight size, the transmitted but not acknowledged data, is low or zero, the TCP connection may be nearly or completely idle or may be at an early phase of start-up, for example in a slow start. Low measured throughput in that phase may not be taken as a trigger to decrease the throughput guidance as the flow may still have a chance to increase its rate and achieve its eligible throughput. In other cases, not reaching the eligible throughput may indicate that the UE has poor individual radio channel quality and the air interface scheduler is unable to allocate enough resources without jeopardizing the throughput of the other bearers. If this is detected, the throughput guidance entity can take the actually achieved throughput, possibly smoothed/averaged, as the throughput guidance as in this case the measured throughput may be an exact indicator of the achievable throughput for the bearer.

Accordingly, when there is data transmission on the bearer and thus the throughput guidance entity can measure its achieved throughput, the throughput guidance value can be derived from the eligible throughput and the current throughput measurement:

$$TG_i = alpha_i \cdot \min(E_i, T_i)$$

where $T_i$ is the measured throughput of the bearer i. When throughput measurement is available, the alpha may be customized for each bearer considering the stability of the throughput achieved by the bearer. Highly fluctuating throughput can map to a lower alpha as the fluctuations indicate a highly dynamic environment where the conditions change frequently. It may be reasonable to leave more headroom in the throughput guidance between the estimated throughput and what is published. The fluctuation can be quantized by taking throughput measurements at subsequent time intervals and calculating the statistical parameters, such as deviation, of the throughput samples.

The throughput guidance based on user plane monitoring can have the advantage that the monitoring is able to provide an accurate throughput guidance during the entire lifetime of a bearer, which may be useful for efficient TCP and content optimization by the receiver of the throughput guidance. When there is additional radio measurement available for the bearer, such as provided by the RACS platform, the additional radio measurement may be used to modify the throughput guidance based on the eligible throughput. Particularly, explicit indication of poor radio channel quality can improve the throughput guidance calculation when there has been no recent data transmission and thus no actual throughput measurement is available. Using the radio insight after the establishment of a new bearer may be possible when a radio measurement is already available during an RRC connection establishment phase of the bearer setup. The initial radio measurement can be compared to the radio measurements of other bearers to detect if the new bearer is probably an outlier with worse channel conditions. When a series of radio measurements are available, which may be a result of periodic measurement report configuration from the eNB, the fluctuation of the radio measurements can also be used to scale down the throughput guidance via the alpha parameter.

The throughput guidance entity can also provide reliable throughput guidance in the presence of LTE Carrier Aggregation. The throughput guidance entity can obtain an indication of which UEs support the CA. Such an indication may be available from the RRC signaling and could be provided by the RACS platform. In order to calculate the eligible throughput of the bearers using CA, the throughput guidance entity can follow the same logic as the CA enabled RRM does in the eNB. The per bearer actual throughput measurement may be independent of whether the UE uses CA or not.

The throughput guidance discussed so far can provide guidance on the bearer level throughput. In practice, there may be multiple active applications and TCP flows initiated by the same UE, simultaneously transmitting traffic in the same bearer. The per bearer throughput guidance therefore may be useful for an optimization entity that has full visibility of the bearer level traffic, such an entity that terminates, proxies or intercepts all flows in the bearer, such as an adaptation gateway deployed in the operator premises. Such an entity can use the bearer level throughput guidance to intelligently optimize all flows within the bearer. OTT servers, on the other hand, may only have visibility and influence on the particular content they serve and the corresponding TCP flows.

For efficient optimization that creates no interference among different application and flows, OTT servers can receive the bandwidth available for their own application, such as application level throughput guidance, or for each individual TCP flow, such as flow level throughput guidance. Otherwise, multiple OTT servers may utilize the entire bandwidth available for the bearer, which could lead to congestion, packet loss and degradation for all applications.

In order to enable meaningful optimization in the presence of multiple applications, the throughput guidance entity can be configured to calculate and publish both application level and TCP flow level throughput guidance in addition to the bearer level throughput guidance. The application level throughput guidance can be derived by partitioning the bearer level throughput guidance among the detected active applications. The TCP flow level throughput guidance can be further derived from the application level throughput guidance. Thus, the sum of the application level throughput guidance as well as the sum of the TCP flow level throughput guidance can yield the bearer level throughput guidance, which may be useful for optimally using the entire bearer level bandwidth by the independent optimization mechanisms running at different OTT servers.

Partitioning may be possible along different alternative policies, including operator defined policies. In order to calculate the application level throughput guidance, the throughput guidance entity may receive/detect and take into account the bandwidth requirement of each application, such as the media rate of a video download, or the bandwidth required to download a web page within a reasonable time. The TCP flow level throughput guidance can be calculated by dividing the application level throughput guidance among the corresponding TCP connections, either equally to achieve per-TCP fairness or by any other policy. When the application level throughput guidance is not used, the TCP flow level throughput guidance may be calculated by directly partitioning the bearer level throughput guidance along the same principles.

As mentioned above, in certain embodiments the throughput guidance entity can be implemented in an eNB. In that case, the throughput guidance entity may have full access to the entire RRM and the radio packet scheduler of the eNB. Thus, an eNB based throughput guidance entity can natively take into account the full context, including the behavior and logic of the packet scheduler, the user plane and radio conditions of the cell and the UEs, and each active or idle but established bearer during their entire lifetime.

The resource allocation, such as which PRBs would be given to a bearer, combined with the coding rate indicated by the frequency aware CQI reported by the UE, available in the eNB, can provide information about the throughput that the bearer would achieve, which can be a basis for defining the throughput guidance for the bearer. The throughput guidance for an application or individual TCP flow can be derived from the per bearer throughput guidance in similar ways as discussed above.

The eNB side implementation can support handover via the same mechanisms as the RACS based implementation. For example, the eNB side implementation can rely on enrichment of the X2 forwarded data and/or explicit context transfer.

In a further embodiment, there can be an RNC side implementation, as mentioned above. When the throughput guidance entity is implemented in the RNC, the throughput guidance entity may have access to the RRM and also the HS-DSCH credit allocations of each bearer, including Iub flow control and congestion control. Thus, the throughput guidance entity may have additional information on the throughput that the bearer could achieve. This information can be incorporated to the throughput guidance to be published for external OTT servers.

For the RNC side implementation, only inter-RNC handovers need support similar to the RACS/eNB side implementations. Thus, the impact of handovers may be much less compared to the LTE case. In the RNC side implementation case, the enriched packets can be forwarded through the Iur interface.

As mentioned above, there may be various ways of providing or publishing the throughput guidance. The throughput guidance entity may deliver the throughput guidance information to the OTT server either via in-band header enrichment or via a dedicated off-band connection.

Figure 7:
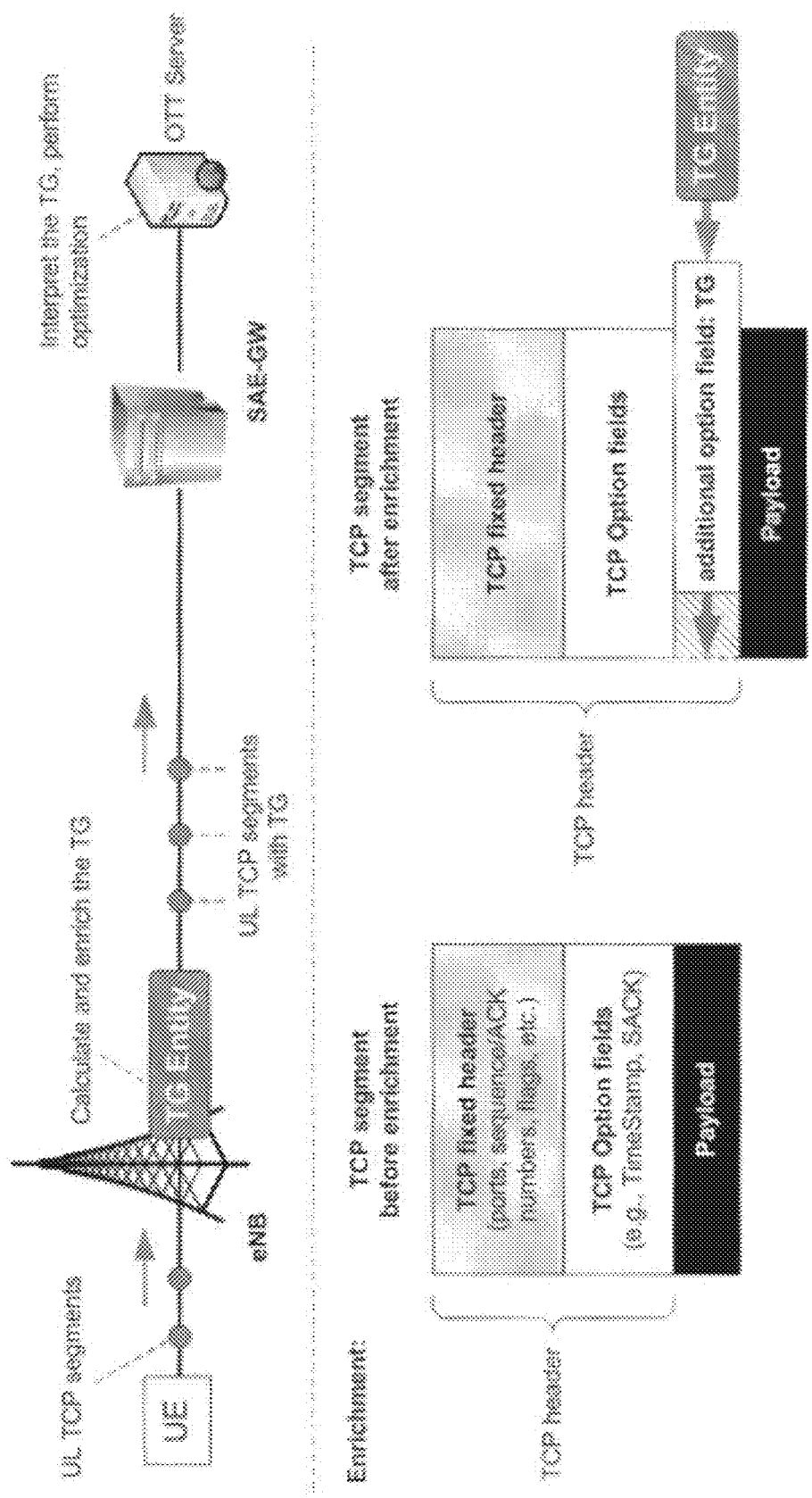
FIG. 7 illustrates enrichment of throughput guidance in a TCP header, according to certain embodiments.

FIG. 7 illustrates enrichment of throughput guidance in a TCP header, according to certain embodiments. The in-band header enrichment can encode the throughput guidance into the headers of the UL user plane packets. The new information element may be added as an experimental TCP option, for example kind 253 or 254 as shown in FIG. 7, in the TCP header, as an experimental internet protocol (IP) header, a standardized TCP or IP header field, in the hypertext transport protocol (HTTP) header or in any additional protocol header that supports extensions.

Authentication or additional encryption of the throughput guidance information is also possible. Since the throughput guidance entity is monitoring the user plane packets, the throughput guidance entity may able to establish the identity of the server, for example via HTTP uniform resource locator (URL) detection, domain name service (DNS) monitoring or, in case of encrypted traffic, by detecting the transport layer security (TLS) certificate of the server or the server's fully qualified domain name (FQDN) from the client hello packet.

The throughput guidance entity can also implement selective header enrichment, such as only publishing the throughput guidance for licensed parties. Additional parameters could be exposed in the same way, with a set of parameters possibly customized towards each OTT server. In-band header enrichment can be configured such that throughput guidance value arrives at the OTT server in full context, indicating both the identity of the flow, application or bearer it applies to as well as synchronizing the information with the status of the user plane flows and the progress of the data download.

Figure 8:
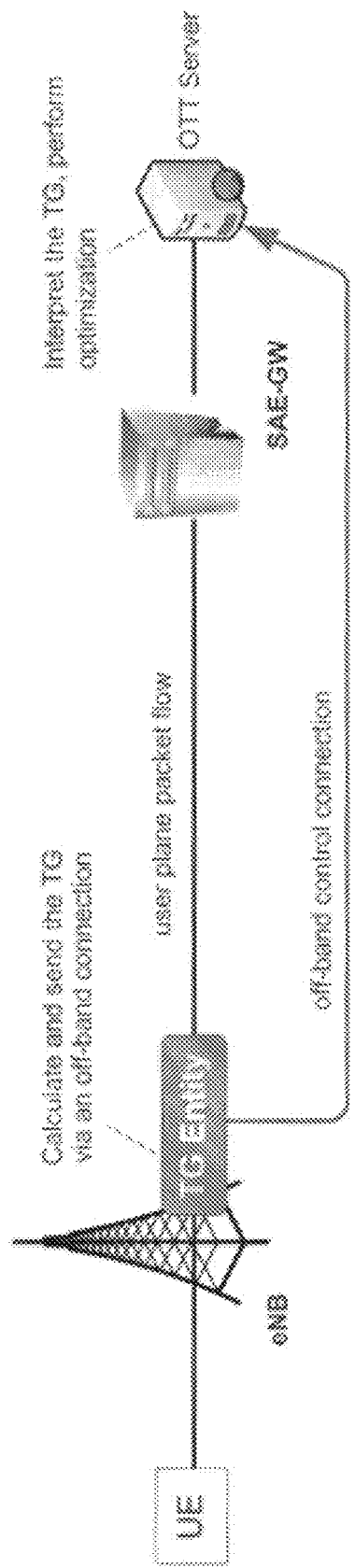
FIG. 8 illustrates sending throughput guidance information off-band from the throughput guidance entity to the OTT server, according to certain embodiments.

FIG. 8 illustrates sending throughput guidance information off-band from the throughput guidance entity to the OTT server, according to certain embodiments. An alternative to the in-band header enrichment is to set up a dedicated connection between the throughput guidance entity and the OTT server and transfer the throughput guidance value separately from the user plane packets, as shown in FIG. 8. Off band communication can be used when in-band header enrichment is not possible for any reason. The throughput guidance entity may not be able to modify the packets or the extra headers may be stripped off by intermediate firewalls. In such a case, the throughput guidance information sent through the off-band connection can be extended by additional information that identifies the scope of the throughput guidance, such as the bearer, application or flow, as well as to synchronize the throughput guidance with the user plane flows and the progress of the download.

The throughput guidance entity may also transfer the throughput guidance to the UE via the same in-band header enrichment mechanism it may use to send the information to the OTT server, as shown in FIG. 7. However, in this case the downlink TCP segments can be enriched instead of the uplink packets.

Figure 9:
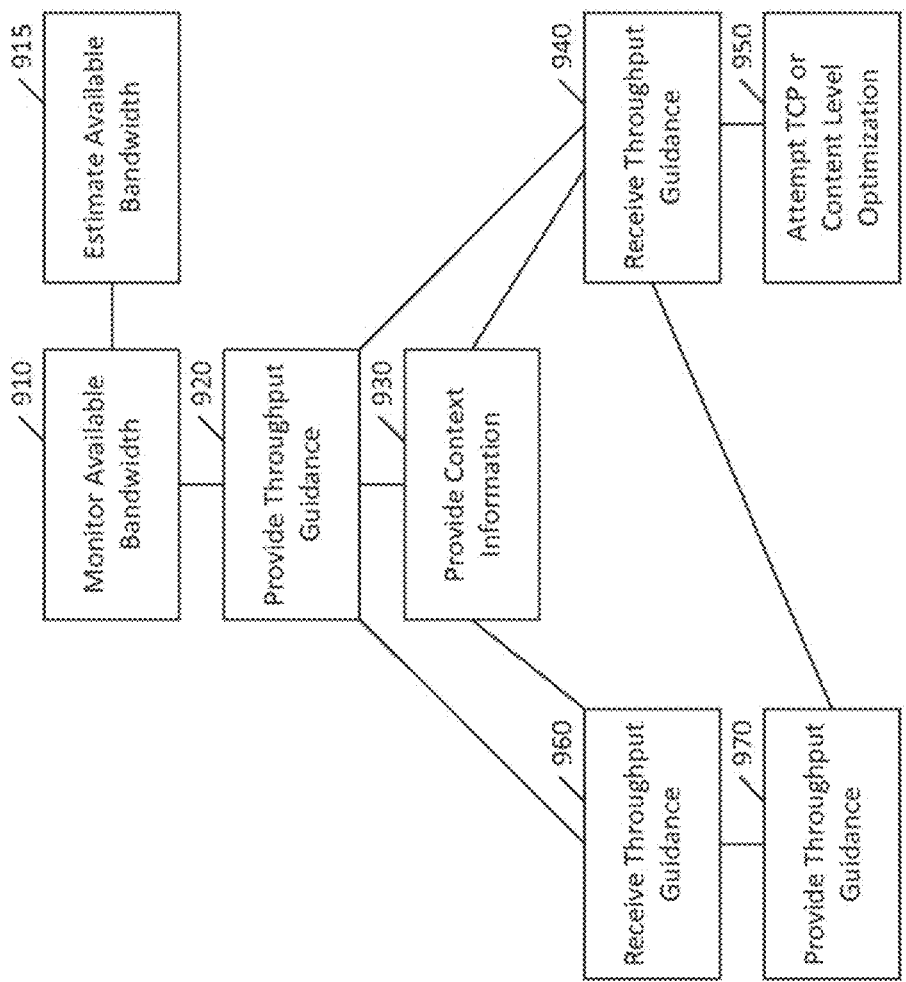
FIG. 9 illustrates a method according to certain embodiments.

FIG. 9 illustrates a method according to certain embodiments. As shown in FIG. 9, a method can include monitoring, at 910, the bandwidth available on at least one of a per data bearer, per application or per transmission control protocol flow basis. The method can be performed in at least one of an evolved node B, a radio application cloud server, or a radio network controller. The monitoring can be performed on a per radio access node basis. The monitoring can include monitoring capacity of a plurality cells, mobility of a plurality of user equipment, and behavior of a radio scheduler. The monitoring can include at least one of control plane monitoring, user plane monitoring, and radio monitoring.

The method can also include, at 920, providing throughput guidance to an entity configured to attempt at least one of transmission control protocol or content level optimization, wherein the throughput guidance is configured to assist the entity in attempting the at least one of the transmission control protocol or content level optimization.

The method can further include, at 930, providing to the entity, in addition to the throughput guidance, context information. The context information can include, for example, information about other bearers, other applications, demand in a cell or demand at a base station.

The method can additionally include, at 915, estimating the bandwidth available. The estimating can include calculating a fair share of a bearer from a cell's capacity at a given time, wherein the fair share is the throughput guidance for the bearer. The estimating can involve considering at least one of individual per-bearer attributes, throughput requirements of active applications, individual per-bearer limitations, and a number of simultaneous transmission protocol control connections in a same bearer.

Throughput guidance can include at least one of application level throughput guidance or transmission control protocol flow level throughput guidance in addition to bearer level throughput guidance The method can also include, at 940, receiving throughput guidance from a throughput guidance entity or user equipment in communication with a throughput guidance entity.

The method can further include, at 950, attempting at least one of transmission control protocol or content level optimization based on the throughput guidance.

The method can additionally include, at 960, receiving throughput guidance from a throughput guidance entity. The method can also include, at 970, providing the throughput guidance to an entity configured to attempt at least one of transmission control protocol or content level optimization. The throughput guidance can be configured to assist the entity in attempting the at least one of the transmission control protocol or content level optimization. The providing can include combining the throughput guidance with other control information sent to a content server.

In FIG. 9, the left side of the figure shows an indirect, such as via the UE, delivery route of the TG information to the entity performing the optimization, such as the server. By contrast, the right side FIG. 9 shows the entity performing the optimization itself.

Figure 10:
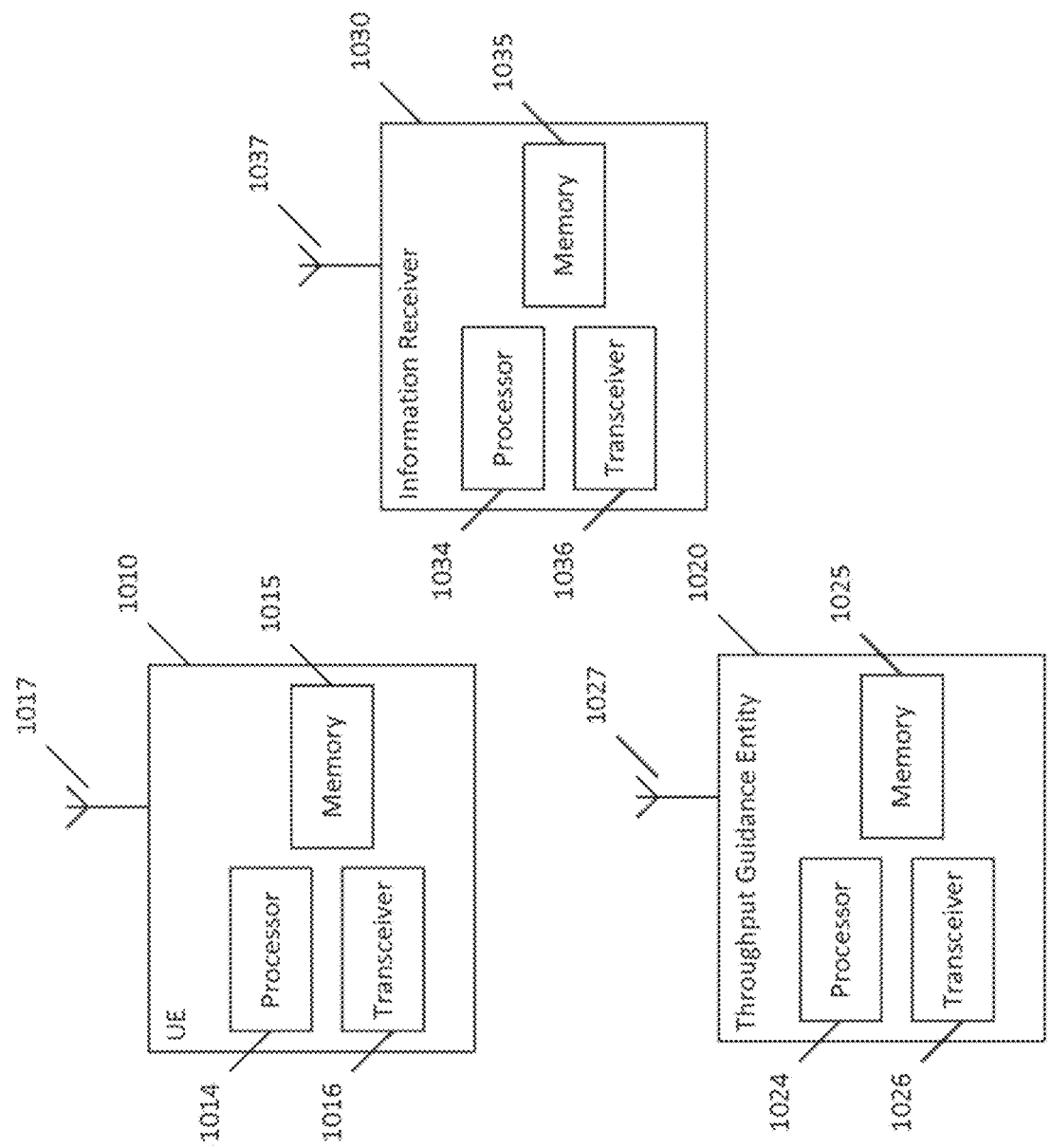
FIG. 10 illustrates a system according to certain embodiments.

FIG. 10 illustrates a system according to certain embodiments of the invention. In one embodiment, a system may include multiple devices, such as, for example, at least one UE 1010, at least one throughput guidance entity 1020, which may be an eNB, RACS, RNC, or other base station or access point, and at least one information receiver 1030, which may be an adaptation gateway, OTT Server, UE, or other entity configured to receive throughput guidance.

Each of these devices may include at least one processor, respectively indicated as 1014, 1024, and 1034. At least one memory can be provided in each device, and indicated as 1015, 1025, and 1035, respectively. The memory may include computer program instructions or computer code contained therein. The processors 1014, 1024, and 1034 and memories 1015, 1025, and 1035, or a subset thereof, can be configured to provide means corresponding to the various blocks of FIG. 9.

As shown in FIG. 10, transceivers 1016, 1026, and 1036 can be provided, and each device may also include an antenna, respectively illustrated as 1017, 1027, and 1037. Other configurations of these devices, for example, may be provided. For example, information receiver 1030 may be configured for wired communication, in addition to wireless communication, and in such a case antenna 1037 can illustrate any form of communication hardware, without requiring a conventional antenna.

Transceivers 1016, 1026, and 1036 can each, independently, be a transmitter, a receiver, or both a transmitter and a receiver, or a unit or device that is configured both for transmission and reception.

Processors 1014, 1024, and 1034 can be embodied by any computational or data processing device, such as a central processing unit (CPU), application specific integrated circuit (ASIC), or comparable device. The processors can be implemented as a single controller, or a plurality of controllers or processors.

Memories 1015, 1025, and 1035 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as UE 1010, throughput guidance entity 1020, and information receiver 1030, to perform any of the processes described herein (see, for example, FIG. 9). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 10 illustrates a system including a UE, throughput guidance entity, and information receiver, embodiments of the invention may be applicable to other configurations, and configurations involving additional elements. For example, not shown, additional UEs may be present, and additional core network elements may be present, as illustrated in FIG. 2.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

Partial Glossary

ACK Acknowledgment
CA Carrier Aggregation
CDN Content Delivery Network
CQI Channel Quality Indicator
CSS Cascading Style Sheets
DL Downlink
DNS Domain Name Service
eNB Evolved Node B
GBR Guaranteed Bitrate
GW Gateway
HSPA High Speed Packet Access
HTML Hypertext Markup Language
IP Internet Protocol
LTE Long Term Evolution
OTT Over The Top
PRB Physical Resource Block
RACS Radio Application Cloud Server
RNC Radio Network Controller
RRC Radio Resource Control
RRM Radio Resource Management
RSRP Reference Signal Received Power
RSRQ Reference Signal Received Quality
RTT Round Trip Time
TCP Transmission Control Protocol
TG Throughput Guidance
TGE Throughput Guidance Entity
UE User Equipment
UL Uplink
WCDMA Wideband Code Division Multiple Access

We claim:

1. A method for providing throughput guidance in a throughput guidance entity arranged in a mobile network between a server and user equipment that is downloading content from the server, the method comprising:
monitoring, by the throughput guidance entity in the mobile network, bandwidth available for the download on at least one of a per data bearer, per application or per transmission control protocol flow basis, wherein the monitoring comprises monitoring capacity of a plurality of cells, mobility of a plurality of user equipments, and behavior of a radio scheduler;
providing, by the throughput guidance entity in the mobile network, on the basis of the monitoring, throughput guidance comprising information on the bandwidth available for the download to an entity configured to perform at least one of transmission control protocol optimization or content level optimization on the basis of the information, wherein the entity is the server or an adaptation gateway.

2. The method of claim 1, wherein the monitoring is performed on a per radio access node basis.

3. The method of claim 1, wherein the throughput guidance entity comprises at least one of an evolved node B, a radio application cloud server, mobile edge computing node, or a radio network controller.

4. The method of claim 1, wherein the monitoring comprises at least one of control plane monitoring, user plane monitoring, and radio monitoring.

5. The method of claim 1, wherein the throughput guidance comprises at least one of application level throughput guidance or transmission control protocol flow level throughput guidance in addition to bearer level throughput guidance.

6. A method for performing at least one of transmission control protocol optimization or content level optimization, comprising:
receiving, by a network entity comprising at least one of an adaptation gateway or an over-the-top server, throughput guidance from a throughput guidance entity in a mobile network or user equipment in communication with a throughput guidance entity in a mobile network, the throughput guidance entity arranged in a mobile network between a server and user equipment that is downloading content from the server, and the throughput guidance comprising information on a bandwidth available for the download, wherein the bandwidth available for the download indicates capacity of a plurality of cells, mobility of a plurality of user equipments, and behavior of a radio scheduler; and
performing, by a network entity comprising at least one of an adaptation gateway or an over-the-top server, transmission control protocol optimization or content level optimization for the download based on the received information on the bandwidth available for the download.

7. A method for providing throughput guidance, comprising:
- receiving, by a user equipment, throughput guidance from a throughput guidance entity arranged in a mobile network between a server and the user equipment while downloading content from the server, the throughput guidance comprising information on a bandwidth available for the download, wherein the bandwidth available for the download indicates capacity of a plurality of cells, mobility of a plurality of user equipments, and behavior of a radio scheduler;
- providing, by the user equipment, the throughput guidance comprising the information on the bandwidth available for the download to another entity configured to perform at least one of transmission control protocol optimization or content level optimization for the download,
- wherein the throughput guidance is configured to assist the other entity in performing the at least one of the transmission control protocol optimization or content level optimization for the download.

8. The method of claim 7, wherein the providing comprises combining the throughput guidance with other control information sent to the other entity.

9. An apparatus, comprising:
- at least one processor; and
- at least one memory including computer program code,
- wherein the at least one memory and the computer program code are configured to, with the at least one processor, cause the apparatus at least to
- monitor, in a network between a server and user equipment that is downloading content from the server, bandwidth available for the download on at least one of a per data bearer, per application or per transmission control protocol flow basis;
- provide, on the basis of the monitoring, throughput guidance comprising information on the bandwidth available for the download to an entity configured to perform at least one of transmission control protocol optimization or content level optimization on the basis of the information, wherein the entity is the server or an adaptation gateway; and
- monitor capacity of a plurality of cells, mobility of a plurality of user equipments, and behavior of a radio scheduler,
- wherein the apparatus comprises a throughput guidance entity in a mobile network.

10. The apparatus of claim 9, wherein the at least one memory and the computer program code are configured to, with the at least one processor, cause the apparatus at least to provide to the entity, in addition to the throughput guidance, context information comprising information about other bearers, other applications, demand in a cell or demand at a base station.

11. The apparatus of claim 9, wherein the at least one memory and the computer program code are configured to, with the at least one processor, cause the apparatus at least to monitor on a per radio access node basis.

12. The apparatus of claim 9, wherein the apparatus can be at least one of an evolved node B, a radio application cloud server, mobile edge computing node or a radio network controller.

13. The apparatus of claim 9, wherein the at least one memory and the computer program code are configured to, with the at least one processor, cause the apparatus at least to monitor by at least one of control plane monitoring, user plane monitoring, and radio monitoring.

14. The apparatus of claim 9, wherein the throughput guidance comprises at least one of application level throughput guidance or transmission control protocol flow level throughput guidance in addition to bearer level throughput guidance.

15. An apparatus for performing at least one of transmission control protocol optimization or content level optimization, comprising:
- at least one processor; and
- at least one memory including computer program code,
- wherein the at least one memory and the computer program code are configured to, with the at least one processor, cause the apparatus at least to
- receive throughput guidance from a throughput guidance entity in a mobile network or user equipment in communication with a throughput guidance entity in a mobile network, the throughput guidance entity arranged in a network between a server and user equipment that is downloading content from the server, and the throughput guidance comprising information on a bandwidth available for the download, wherein the bandwidth available for the download indicates capacity of a plurality of cells, mobility of a plurality of user equipments, and behavior of a radio scheduler; and
- perform transmission control protocol optimization or content level optimization based on the received information on the bandwidth available for the download,
- wherein the apparatus comprises at least one of an adaptation gateway or an over-the-top server.

16. An apparatus for providing throughput guidance comprising:
- at least one processor; and
- at least one memory including computer program code,
- wherein the at least one memory and the computer program code are configured to, with the at least one processor, cause the apparatus at least to
- receive throughput guidance from a throughput guidance entity arranged in a mobile network between a server and the apparatus while downloading content from the server, the throughput guidance comprising information on a bandwidth available for the download, wherein the bandwidth available for the download indicates capacity of a plurality of cells, mobility of a plurality of user equipments, and behavior of a radio scheduler; and
- provide the throughput guidance comprising the information on the bandwidth available for the download to another entity configured to perform transmission control protocol optimization or content level optimization for the download,
- wherein the apparatus comprises a user equipment, and
- wherein the throughput guidance is configured to assist the other entity in performing the at least one of the transmission control protocol optimization or content level optimization for the download.

17. The apparatus of claim 16, wherein the at least one memory and the computer program code can also configured to, with the at least one processor, cause the apparatus at least to combine the throughput guidance with other control information sent to the other entity.

18. A non-transitory computer-readable medium storing instructions that, when executed by a processing device, perform at least one of a first method and a second method and a third method,
- wherein the first method is a method for providing throughput guidance in a throughput guidance entity arranged in a mobile network between a server and user equipment that is downloading content from the server, the first method comprising:

monitoring, by the throughput guidance entity in the mobile network, bandwidth available for the download on at least one of a per data bearer, per application or per transmission control protocol flow basis, wherein the monitoring comprises monitoring capacity of a plurality of cells, mobility of a plurality of user equipments, and behavior of a radio scheduler;

providing, by the throughput guidance entity in the mobile network, on the basis of the monitoring, throughput guidance comprising information on the bandwidth available for the download to an entity configured to perform at least one of transmission control protocol optimization or content level optimization on the basis of the information, wherein the entity is the server or an adaptation gateway;

wherein the second method is a method for performing at least one of transmission control protocol optimization or content level optimization, comprising:

receiving, by a network entity comprising at least one of an adaptation gateway or an over-the-top server, throughput guidance from a throughput guidance entity in a mobile network or user equipment in communication with a throughput guidance entity in a mobile network, the throughput guidance entity arranged in a network between a server and user equipment that is downloading content from the server, and the throughput guidance comprising information on a bandwidth available for the download, wherein the monitoring comprises monitoring capacity of a plurality of cells, mobility of a plurality of user equipments, and behavior of a radio scheduler; and performing, by the network entity, transmission control protocol optimization or content level optimization for the download based on the received information on the bandwidth available for the download; and wherein the third method is a method for providing throughput guidance, comprising:

receiving, by a user equipment, throughput guidance from a throughput guidance entity arranged in a mobile network between a server and the user equipment while downloading content from the server, the throughput guidance comprising information on a bandwidth available for the download;

providing, by the user equipment, the throughput guidance comprising the information on the bandwidth available for the download to another entity configured to perform at least one of transmission control protocol optimization or content level optimization for the download, wherein the throughput guidance is configured to assist the other entity in performing the at least one of the transmission control protocol optimization or content level optimization for the download.

\* \* \* \* \*